(12) United States Patent
Riedel

(10) Patent No.: US 12,103,174 B2
(45) Date of Patent: Oct. 1, 2024

(54) ROBOT ARM AND METHOD FOR ASSEMBLING A ROBOT ARM

(71) Applicant: KUKA Deutschland Gmbh, Augsburg (DE)

(72) Inventor: Martin Riedel, Augsburg (DE)

(73) Assignee: KUKA Deutschland GmbH (DE)

( * ) Notice: Subject to any disclaimer, the term of this patent is extended or adjusted under 35 U.S.C. 154(b) by 35 days.

(21) Appl. No.: 18/252,556

(22) PCT Filed: Oct. 29, 2021

(86) PCT No.: PCT/EP2021/080125
§ 371 (c)(1),
(2) Date: Sep. 11, 2023

(87) PCT Pub. No.: WO2022/101030
PCT Pub. Date: May 19, 2022

(65) Prior Publication Data
US 2024/0017400 A1     Jan. 18, 2024

(30) Foreign Application Priority Data
Nov. 13, 2020    (DE) .................... 10 2020 214 332.3

(51) Int. Cl.
*B25J 9/10*     (2006.01)
*B25J 9/04*     (2006.01)
*B25J 19/00*    (2006.01)

(52) U.S. Cl.
CPC ............... *B25J 9/046* (2013.01); *B25J 9/106* (2013.01); *B25J 9/108* (2013.01); *B25J 19/007* (2013.01)

(58) Field of Classification Search
CPC ... B25J 9/046; B25J 9/106; B25J 9/108; B25J 19/007; B25J 9/04; B25J 9/104
See application file for complete search history.

(56) References Cited

U.S. PATENT DOCUMENTS

| | | | | |
|---|---|---|---|---|
| 4,531,884 A | * | 7/1985 | Russell | .................... B25J 9/046 D15/199 |
| 4,899,637 A | | 2/1990 | Caruso | |

(Continued)

FOREIGN PATENT DOCUMENTS

| | | |
|---|---|---|
| CN | 101780673 A | 7/2010 |
| CN | 104786217 B | 1/2017 |

(Continued)

OTHER PUBLICATIONS

European Patent Office; Search Report in related International Patent Application No. PCT/EP2021/080125 dated Feb. 9, 2022; 2 pages.

(Continued)

*Primary Examiner* — Thomas C Diaz
(74) *Attorney, Agent, or Firm* — Dorton & Willis, LLP

(57) ABSTRACT

A robot arm includes a plurality of links and a plurality of joints connecting the links for adjustment relative to one another. At least a first link has a first bearing pin, a second bearing pin located opposite the first bearing pin, and a second link connected in an articulated manner to the first link by one of the joints has a first bearing flange on which the first bearing pin of the first link is rotatably mounted, and has a second bearing flange on which the second bearing pin of the first is rotatably mounted. The first bearing flange of the second link has a circumferentially closed recess in which the first bearing pin of the first link is received, and the second bearing flange of the second link has a circumferentially open recess in which the second bearing pin of the first link is received. An opening in the circumferentially open recess has an opening width that is greater than the width of the second bearing pin of the first link, and the second bearing flange has securing structure with which the (Continued)

second bearing of the first link is secured to the circumferentially open recess of the second bearing flange.

11 Claims, 6 Drawing Sheets

(56) References Cited

U.S. PATENT DOCUMENTS

| | | |
|---|---|---|
| 5,261,316 A | 11/1993 | Nishikawa et al. |
| 5,523,662 A | 6/1996 | Goldenberg et al. |
| 9,610,686 B2 * | 4/2017 | Song .......................... B25J 9/08 |
| 9,827,682 B2 | 11/2017 | Adachi et al. |
| 2021/0308877 A1 | 10/2021 | Riegger et al. |
| 2022/0015978 A1 | 1/2022 | Riedel |

FOREIGN PATENT DOCUMENTS

| | | | |
|---|---|---|---|
| CN | 111376311 A * | 7/2020 | .......... B25J 17/0241 |
| DE | 102018219447 A1 | 5/2020 | |
| EP | 3626406 A1 | 3/2020 | |
| WO | 9901261 A1 | 1/1999 | |

OTHER PUBLICATIONS

German Patent Office; Examination Report in related German Patent Application No. 10 2020 214 332.3 dated Aug. 2, 2021; 7 pages.

European Patent Office; International Preliminary Report in related International Patent Application No. PCT/EP2021/080125 dated May 16, 2023; 7 pages.

* cited by examiner

ROBOT ARM AND METHOD FOR ASSEMBLING A ROBOT ARM

CROSS-REFERENCE TO RELATED APPLICATIONS

This application is a national phase application under 35 U.S.C. § 371 of International Patent Application No. PCT/EP2021/080125, filed Oct. 29, 2021, which claims the benefit of priority to German Patent Application No. DE 10 2020 214 332.3, filed Nov. 13, 2020, the disclosures of which are incorporated by reference herein in their entirety.

TECHNICAL FIELD

The invention relates to a robot arm, comprising a plurality of links and a plurality of joints connecting these links such that they are adjustable relative to one another, as well as to a method for assembling a robot arm.

BACKGROUND

DE 10 2018 219 447 A1 describes a robot structure, comprising a plurality of links and joints connecting these links, wherein at least one link of these links comprises a first tube section having a first outer wall and a second tube section having a second outer wall, the second tube section being arranged with its longitudinal extension at an angle to the longitudinal extension of the first tube section such that the second tube section is inserted into two opposite tube portions of the first tube section, and the second tube section penetrates the first outer wall of the first tube section on opposite sides, wherein the second tube section is rigidly connected to the first tube section by means of a first connecting element and a second connecting element.

SUMMARY

The object of the invention is to provide a robot arm which can be finally assembled in a simple and cost-effective manner from pre-assembled assemblies to form a complete robot arm.

The object is inventively achieved by a robot arm comprising a plurality of links and a plurality of joints connecting these links such that they are adjustable relative to one another, wherein at least a first link of these links has a first bearing pin and a second bearing pin located opposite the first bearing pin, and a second link, which is connected in an articulated manner to the first link by means of one of the joints, has a first bearing flange on which the first bearing pin of the first link is rotatably mounted and has a second bearing flange on which the second bearing pin of the first link is rotatably mounted, wherein the first bearing flange of the second link has a circumferentially closed recess in which the first bearing pin of the first link is received, and the second bearing flange of the second link has a circumferentially open recess in which the second bearing pin of the first link is received, and the second bearing flange of the second link has a circumferentially open recess in which the second bearing pin of the first link is received, wherein an opening of the circumferentially open recess has an opening width that is greater than the width of the second bearing pin of the first link, and the second bearing flange has a securing means with which the second bearing pin of the first link is secured to the circumferentially open recess of the second bearing flange.

The robot arm can have a robot structure, for example, comprising a plurality of links and joints connecting these links, wherein at least one link of said links comprises a first tube section having a first outer wall and a second tube section having a second outer wall, the second tube section being arranged with its longitudinal extension at an angle to the longitudinal extension of the first tube section such that the second tube section is inserted into two opposite tube portions of the first tube section and the second tube section penetrates the first outer wall of the first tube section on opposite sides, the second tube section being rigidly connected to the first tube section by means of a first connecting element and a second connecting element, and for this purpose the first connecting element having a first annular portion, which lies flush with its first annular inner wall on the second outer wall of the second tube section and lies flush with its first annular outer wall on a first portion edge of one tube portion of the first tube section and the first connecting element having a tab portion adjoining the first annular portion, which tab portion extends with its longitudinal extension along the longitudinal extension of the first tube section so as to lie flush on its first outer wall, and for this purpose the second connecting element having a second annular portion, which lies flush with its second inner annular wall on the second outer wall of the second tube section and lies flush with its second outer annular wall on a second portion edge of the other tube portion of the first tube section and the second connecting element having a cylinder lateral portion which adjoins the second annular portion and which lies flush on an inner wall of the first tube section.

The second tube section can in particular be inserted with its longitudinal extension at a right angle to the longitudinal extension of the first tube section into the first tube section, so that the second tube section is arranged perpendicularly to the first tube section.

The first connecting element and/or the second connecting element can each be designed as a one-piece plastics body.

The first bearing pin and the second bearing pin located opposite the first bearing pin can be designed in the form of stub shafts, the shaft rotational axes of which are aligned with one another. In this respect, the first bearing pin and the second bearing pin can form a common axis of rotation about which the first link is mounted so as to be pivotable relative to the second link.

The joint which rotatably connects the first link to the second link can in this respect be designed as a pivot joint. The robot arm may have a single such joint which inventively rotatably connects such a first link to such a second link. Alternatively, two or more such joints can also be provided on the robot arm, which inventively rotatably connect such pairs of first links and second links. This can mean that the robot arm consists not only of a first assembly of links and joints and a second assembly of links and joints, but also a third and/or further assembly of links and joints.

The first bearing flange and the second bearing flange can enclose the first link or the first bearing pin and the opposite second bearing pin of the first link from opposite sides. In this respect, the first bearing flange and the second bearing flange are aligned with the first bearing pin and the second bearing pin. In a design-specific basic configuration of the robot arm, the first bearing pin and the opposite second bearing pin can be arranged vertically aligned, in particular always arranged vertically aligned in all rotational positions of the joint which rotatably connects the first link to the second link. Accordingly, the first bearing flange and the second bearing flange can be arranged one above the other, in particular always arranged one above the other in all rotational positions of the joint which rotatably connects the first link to the second link. In this respect, this joint can be designed in the manner of one of the first three joints in a kinematic chain of joints of a SCARA robot.

The circumferentially closed recess of the first bearing flange can be a bore in an at least substantially planar first flange plate. The first flange plate can be formed by a first metal sheet. For reinforcement thereof, the first metal sheet can be provided with ribs, beads and/or edge bevels. The first flange plate can be part of a carriage of a linear axis.

The circumferentially open recess of the second bearing flange can be an open-edged bore in an at least substantially planar second flange plate. For reinforcement thereof, the second metal sheet can be provided with ribs, beads and/or edge bevels. The second flange plate can be part of a carriage of a linear axis.

The opening of the circumferentially open recess can be formed by an open-edge cutout in the second bearing flange or in the second flange plate. The opening width of the opening must be dimensioned such that the second bearing pin can be moved in a radial direction from outside the second bearing flange into the opening of the circumferentially open recess. The second bearing pin is therefore inventively inserted into the circumferentially open recess not in an axial direction, i.e., not in the direction of the axis of rotation of the joint which rotatably connects the first link to the second link, but is rather pushed or pivoted into the circumferentially open recess from the side, i.e., radially to the axis of rotation of the joint which rotatably connects the first link to the second link.

The opening width of the opening must accordingly be at least slightly greater than the width of the second bearing pin. In the case of a circular cylindrical second bearing pin, the width of the second bearing pin is defined by the diameter of the second bearing pin. In this respect, in the case of a circular cylindrical second bearing pin, the opening width of the opening must accordingly be at least slightly greater than the diameter of the second bearing pin.

By virtue of the fact that the first bearing flange of the second link has a circumferentially closed recess in which the first bearing pin of the first link is received, and the second bearing flange of the second link has a circumferentially open recess in which the second bearing pin of the first link is received, wherein an opening of the circumferentially open recess has an opening width which is greater than the width of the second bearing pin of the first link, and the second bearing flange has a securing means with which the second bearing pin of the first link is secured on the circumferentially open recess of the second bearing flange, a robot arm can be created which can be finally assembled in a simple and cost-effective manner from pre-assembled assemblies to form a complete robot arm.

The usual structures of robot arms are oriented to building and assembling the robot arm stepwise, i.e., joint for joint. In the simplest case, the structural links are movably connected to one another via joint units, which can include drives, gears, sensors, brakes and bearings. Screw connections are usual both on the input side and on the output side.

If there is no contiguous joint unit, the corresponding components must be connected individually to the structural elements. This usually means a more complex structure or complex assembly.

So far, the robot arm has had to be constructed and assembled step by step. A pre-assembly of sub-groups, in particular of the entire arm, has not been possible until now, since the joining of axles can be problematic. In particular, when the axles are not held, for example by means of cross roller bearings, but rather via cost-effective simple deep grooved ball bearings in a rigid fixed-to-loose arrangement with a wide support spacing. However, if the joint, as inventively provided, is not constructed part by part, but using two pre-assembled assemblies, the joining of the shaft by a plurality of components is critical in the known types of links and joints, since the preferred joining methods are pressing or gluing for reasons of cost and weight.

The invention solves the dilemma between cost-effective pre-assembly of assemblies and slender, lightweight and integrated joint structure, in particular in the field of cost-effective robots for the consumer sector, due to the inventive joint structure.

In this case, the invention is intended to make it possible to pre-assemble the complete structural mechanism and, on the other hand, the complete linear base with drives and electronics and to easily connect these afterwards in a load-ideal manner.

The securing means with which the second bearing pin of the first link is secured on the circumferentially open recess of the second bearing flange is designed to close the opening when the second bearing pin is pushed or pivoted into the circumferentially open recess. In this respect, after the pushing or pivoting of the second bearing pin, the securing means prevents the second bearing pin from being pushed out or pivoted out of the circumferentially open recess of the second bearing flange. The securing means can be detachably connected to the second bearing flange. The securing means can in particular be detachably connected to the second bearing flange by detachable fastening means. The detachable fastening means can be screws, for example. Alternatively, the securing means can be connected to the second bearing flange non-detachably, i.e., in any case not non-destructively detachably. Such non-detachable securing means can comprise rivets, latching means, adhesive connections and/or welded connections, for example.

The securing means can be formed by a first bearing support ring which is detachably connected to the second bearing flange of the second link and forms a first seat for a first bearing which rotatably supports the second bearing pin of the first link on the second bearing flange of the second link.

The first bearing support ring can comprise a first support ring which has, on the circumference, a first fastening flange portion facing outward, with which the first bearing support ring can be fastened to the second bearing flange of the second link. The first bearing support ring can have an inward facing first seat which is designed to receive an outer ring of a bearing, in particular a roller bearing.

Compared with the conventional prior art, the assembly of the exemplary axle does not take place inventively by axially pushing individual components together, but by pivoting or screwing the first link into the second link, in such a manner that the first bearing pin dips into the circumferentially closed recess of the first bearing flange. The bearing ring carrier can follow the slight inclination of the first link and the subsequent pivoting movement, since at this point it is not yet firmly connected to the bearing flange, but only rests in the bore. A fixation takes place in a later step, in the fully joined state.

The pivoting movement of the first link is only possible because the second bearing flange has the circumferentially open recess in which the second bearing flange has an opening or a gap toward the front, i.e., in the direction of the robot arm, which allows the second bearing pin to pivot through into the second bearing flange. In a preferred embodiment, this recess is located at the lower bearing. After the pivoting movement of the first link, the first bearing support ring is fastened to the second bearing flange in such a manner that the first link is pivotably mounted on the second link.

The first bearing support ring and the second bearing support ring are each connected to the second link, for example screwed, glued or latched, via their associated first bearing flange or second bearing flange.

A decisive feature in a specific embodiment is, among other things, that the upper first bearing support ring contacts the first bearing flange completely over its circumference, but the lower second bearing support ring contacts the second bearing flange only over less than its total circumference, in particular, for example, only over three quarters of its total circumference or only half its total circumference. However, it is crucial that the cylindrical outer lateral surface of the lower second bearing support ring is supported on its side facing away from the opening of the second bearing flange on the cylindrical inner lateral surface of the circumferentially open recess of the second bearing flange in such a manner that here all compressive forces can be transmitted which result from the tilting moment by gravitational force in the joint which connects the first link to the second link.

Thus, all forces are transmitted directly and optimally from the axle via the bearings and the rings to the frame without having to load the screws, provided the main loads on the robot arm and its end effector are directed vertically downward.

Should the arm still be pulled upward or bent upward, the lower bearing is stable enough, by screwing the first bearing support ring to the second bearing flange, in order to also be able to absorb this load.

As alternative bearing variants, a fixed-to-loose bearing or an offset bearing can be possible, in which the upper bearing receives the axial force upward and the lower bearing receives the axial force downward.

The first bearing flange of the second link can have a detachably fastened second bearing support ring which forms a second seat for a second bearing which rotatably supports the first bearing pin of the first link on the first bearing flange of the second link, wherein the first bearing flange of the second link has an assembling space which is dimensioned in such a manner that the second bearing support ring, when detached from the first bearing flange, is pivotable within the assembling space about a pivot axis which extends at least substantially perpendicularly to the axis of rotation of the joint which rotatably connects the first link to the second link.

The second bearing support ring can comprise a second support ring which has, on the circumference, a second fastening flange portion facing outward, with which the second bearing support ring can be fastened to the first bearing flange of the first link. The second bearing support ring can have an inward facing second seat which is designed to receive an outer ring of a bearing, in particular a roller bearing.

The assembling space can be delimited by raised, in particular angled, edge portions of the first bearing flange. The lateral raised, in particular angled, edge portions of the first bearing flange delimit the assembling space laterally in this respect. The underside of the assembling space can be formed by the main surface of the first bearing flange, i.e., by the flange surface in which the circumferentially closed recess is arranged. The assembling space can be designed to be open at the top.

The second bearing support ring is pivotable within the assembling space the second bearing support ring. The pivotability of the second bearing support ring must only be possible to such an extent that in a maximum pivot position of the first link, in particular of the first bearing pin of the first link, which is necessary for the inventive final assembly, the first bearing pin of the first link can be inserted into the second bearing support ring. In the maximum pivot position of the second bearing support ring, the second bearing support ring accordingly extends over a height that is smaller than the overall height of the assembling space or the overall height of the raised, in particular angled, edge portions of the first bearing flange.

The securing means can be formed by a first bearing support ring which is detachably connected to the second bearing flange of the second link and forms a first seat for a first bearing which rotatably supports the second bearing pin of the first link on the second bearing flange of the second link, wherein the second bearing flange is arranged below the first bearing flange in the direction of gravity in a basic configuration of the robot arm, and the first bearing flange of the second link can have a detachably fastened second bearing support ring which forms a second seat for a second bearing which rotatably supports the first bearing pin of the first link on the first bearing flange of the second link, wherein the first bearing flange is arranged above the second bearing flange in the direction of gravity in a basic configuration of the robot arm.

In the basic configuration of the robot arm, the first bearing pin and the opposite second bearing pin can be arranged vertically aligned, in particular always arranged vertically aligned in all rotational positions of the joint which rotatably connects the first link to the second link. Accordingly, the first bearing flange and the second bearing flange can be arranged one above the other, in particular always arranged one above the other in all rotational positions of the joint which rotatably connects the first link to the second link. In this respect, this joint can be designed in the manner of one of the first three joints in a kinematic chain of joints of a SCARA robot.

The joint formed by the first link and the second link can have a structurally restricted pivot angle of less than 360 degrees, in particular of less than 270 degrees, or only of 180 degrees, wherein the opening of the circumferentially open recess on the second bearing flange is arranged in such a manner that the first link protruding from the joint protrudes, in an central pivot position of the joint, in the angular range of the opening of the circumferentially open recess and the recess has a compressive force support portion on an edge portion diametrically opposite the opening.

In a specific embodiment, the second link can form a carriage of a linear axis, which can be designed to be linearly adjustable in height, for example, in a vertical direction. For this purpose, the second link or the carriage can have one or more sliding blocks, by means of which the second link or the carriage can be vertically height-adjustable on rails. The rails can be fastened, for example, to a stationary wall or a stationary frame.

The second link can be composed of a plurality of metal sheets, wherein one of the metal sheets can form the first bearing flange and another metal sheet can form the second bearing flange.

A first motor, in particular a first electric motor, can be arranged on the second link. The first motor may have a first motor shaft. The first motor shaft can have, for example, a first pinion on which a first belt is tensioned. The first belt drives a first driven wheel, which is fixedly connected to the first link. In such an embodiment, the first belt, driven by the first motor, drives the first output gear, whereby due to the fixed connection to the first link, the first link can be automatically pivoted relative to the second link.

A second motor, in particular a second electric motor, can optionally also be arranged on the second link. The second motor can have a second motor shaft. The second motor shaft can have, for example, a second pinion on which a second belt is tensioned. In such a case, the second belt drives a second driven wheel, which is rotatably mounted on the first link. Driven by the second motor, the second belt drives the second driven wheel, whereby due to the rotatably mounted connection of the second driven wheel to the first link, the second driven wheel can be automatically rotated relative to the first link. In this embodiment, this rotational movement is transmitted to a third belt, which is guided along the first link to an additional joint that is distally further remote. In this case, the third belt wraps around a third driven wheel, which is fixedly connected to a third link of the robot arm or the second assembly of the robot arm. Driven by the second motor, the second belt drives the second driven wheel and the second driven wheel drives the third driven wheel via the third belt, whereby due to the fixed connection of the third drive wheel to the third link, the third link can be automatically moved, in particular pivoted, relative to the first link. The third belt may be pre-tensioned by a belt tensioner.

The inventive object is also achieved by a method for assembling a robot arm, in particular for assembling a robot arm according to any embodiment or according to a plurality of embodiments as described, comprising the steps of:
  pre-assembling a first assembly of links and joints of the robot arm, wherein one of the links of the first assembly has a first link which has a first bearing pin and a second bearing pin located opposite the first bearing pin,
  pre-assembling a second assembly of links and joints of the robot arm, wherein one of the links of the second assembly has a second link which has a first bearing flange which is designed for receiving the first bearing pin of the first link in a rotatably mounted manner and a second bearing flange which is designed for receiving the second bearing pin of the first link in a rotatably mounted manner,
  wherein the first bearing flange of the second link has a circumferentially closed recess, the second bearing flange of the second link has a circumferentially open recess and the opening of the circumferentially open recess has an opening width that is greater than the width of the second bearing pin of the first link,
  final assembling of the robot arm by assembling the pre-assembled first assembly and second assembly, in that first the first bearing pin of the first link is inserted at an angle into the circumferentially closed recess of the second link, then the first link is pivoted into its installation position aligned with the axis of rotation of the joint, wherein the second bearing pin of the first link is moved in a radial direction through the opening of the circumferentially open recess of the second bearing flange of the second link, and finally the opening of the circumferentially open recess of the second bearing flange is closed by a securing means which is fastened to the second bearing flange in order to secure the second bearing pin of the first link on the second bearing flange.

To carry out the method, the securing means can be formed by a first bearing support ring which forms a first seat for a first bearing which is designed to rotatably support the second bearing pin of the first link on the second bearing flange of the second link, wherein the second bearing pin of the first link is secured on the second bearing flange by the first bearing support ring being fastened to the second bearing flange after the first link pivots into the installation position and after the second bearing pin moves through the opening of the circumferentially open recess of the second bearing flange.

In order to carry out the method, a second bearing support ring can be provided, which has a second seat for a second bearing which is designed to rotatably support the first bearing pin of the first link on the first bearing flange of the second link, wherein the first bearing flange of the second link has a assembling space which is dimensioned in such a manner that the second bearing support ring, when detached from the first bearing flange, is pivotable about a pivot axis which extends at least substantially perpendicularly to the axis of rotation of the joint which connects the first link to the second link, comprising the steps of inserting the first bearing pin of the first link at an angle into the circumferentially closed recess of the second link and inserting the first bearing pin of the first link into the second bearing support ring when the second bearing support ring is detached from the first bearing flange, and fastening the second bearing support ring to the first bearing flange after the first link is pivoted into its installation position aligned with the axis of rotation of the joint.

Optionally, after the pivoting of the first link into its installation position aligned with the axis of rotation of the joint, the first bearing support ring can first be fastened to the second bearing flange after the second bearing pin moves through the opening of the circumferentially open recess of the second bearing flange, and then the second bearing support ring can be fastened to the first bearing flange.

Optionally, before inserting the first bearing pin of the first link into the circumferentially closed recess of the second link, in particular into the second bearing support ring, a first roller bearing can be inserted between the first bearing pin and the circumferentially closed recess or the second bearing support ring, and/or before inserting the second bearing pin of the first link into the circumferentially open recess of the second link, in particular into the first bearing support ring, a second roller bearing can be inserted between the second bearing pin and the circumferentially open recess or the first bearing support ring.

A specific embodiment of the invention is explained in more detail in the following description with reference to the accompanying figures. Specific features of this embodiment can represent general features of the invention regardless of the specific context in which they are mentioned, optionally also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
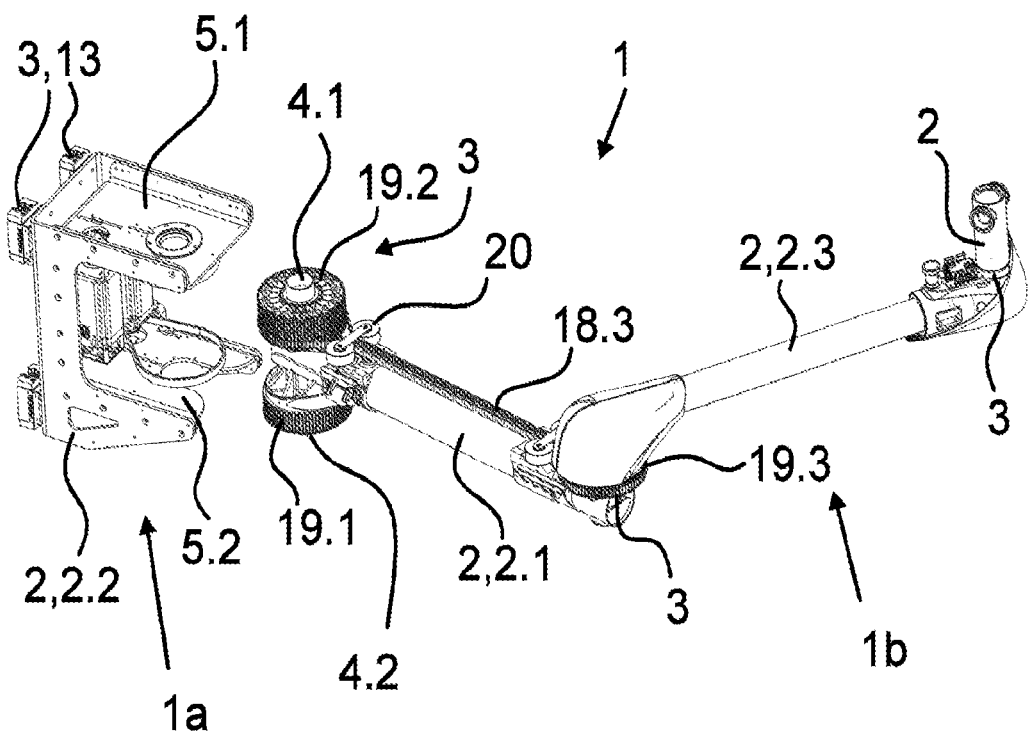
FIG. 1 shows an exemplary robot arm with a first pre-assembled assembly and a second pre-assembled assembly in a separate, not yet finally assembled state in a view from above.

In FIG. 1 an exemplary robot arm 1 is shown in a not yet finally assembled, i.e., separate, state, which comprises a first pre-assembled assembly 1a and a second pre-assembled assembly 1b.

The robot arm 1 has a plurality of links 2 and a plurality of joints 3 connecting these links 2 such that they are adjustable relative to one another, wherein at least a first link 2.1 of these links 2 has a first bearing pin 4.1 and a second bearing pin 4.2 opposite the first bearing pin 4.1.

The robot arm 1 also has a second link 2.2 which is connected in an articulated manner to the first link 2.1 by means of one of the joints 3 and has a first bearing flange 5.1 on which the first bearing pin 4.1 of the first link 2.1 is rotatably mounted in a final assembled state. The second link 2.2 additionally has a second bearing flange 5.2 on which the second bearing pin 4.2 of the first link 2.1 is rotatably mounted.

The first bearing pin 4.1 and the second bearing pin 4.2 located opposite the first bearing pin 4.1 can be designed, as shown, in the form of stub shafts, the shaft rotational axes of which are aligned with one another. In this respect, the first bearing pin 4.1 and the second bearing pin 4.2 can form a common axis of rotation about which the first link 2.1 is mounted so as to be pivotable relative to the second link 2.2.

Figure 5:
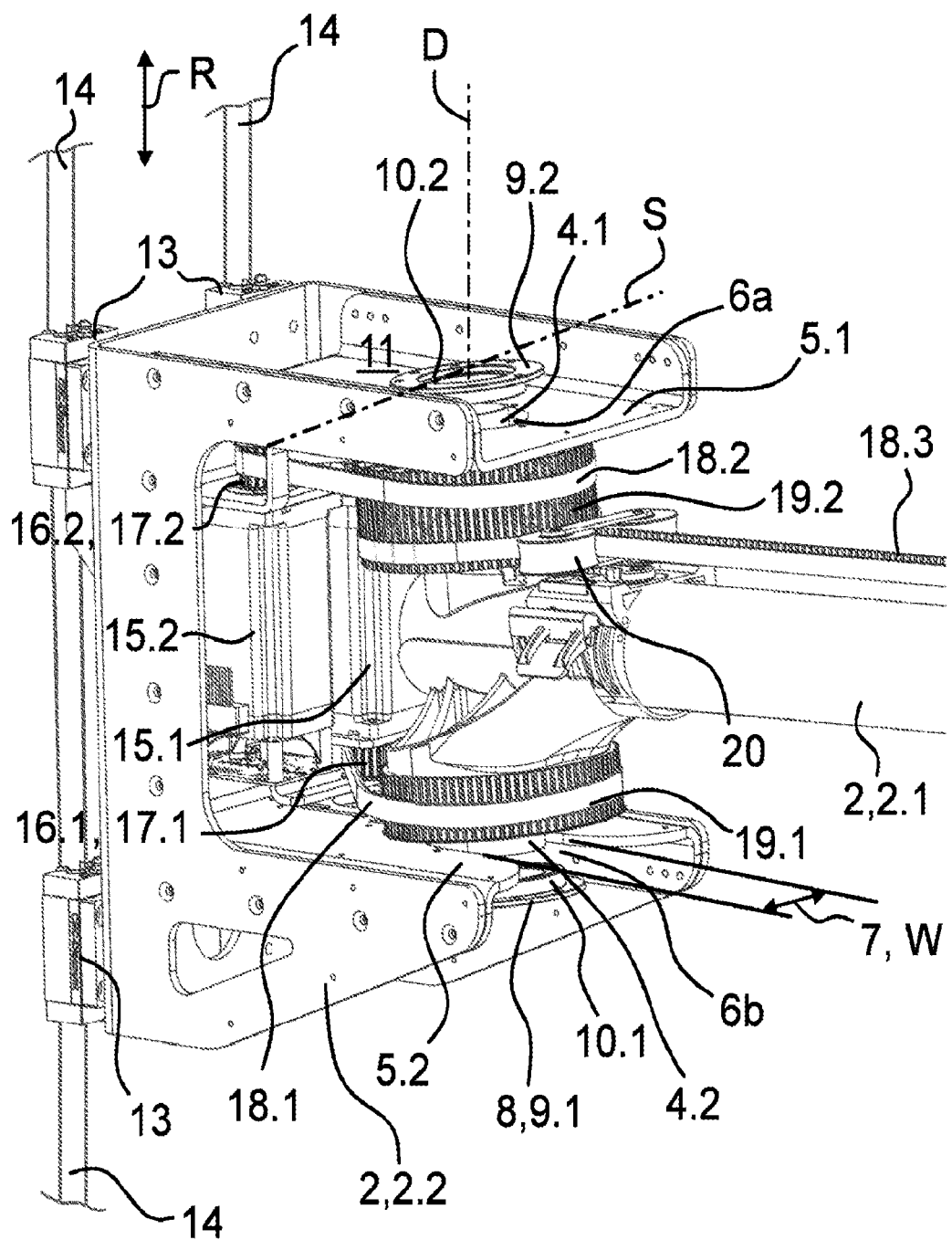
FIG. 5 shows an enlarged partial representation of the robot arm according to FIG. 1 and FIG. 2 in the region of the first link and the second link after insertion.

As is shown in more detail in particular in FIG. 5, the first bearing flange 5.1 of the second link 2.2 has a circumferentially closed recess 6a in which the first bearing pin 4.1 of the first link 2.1 is received. The second bearing flange 5.2 of the second link 2.2 has a circumferentially open recess 6b in which the second bearing pin 4.2 of the first link 2.1 is received in the finally assembled assembly.

An opening 7 of the circumferentially open recess 7b has an opening width W which is greater than the width of the second bearing pin 4.2 of the first link 2.1. The second bearing flange 2.2 has a securing means 8 with which the second bearing pin 4.2 of the first link 2.1 is secured to the circumferentially open recess 7b of the second bearing flange 5.2.

In the case of the present exemplary embodiment, the securing means 8 is formed by a first bearing support ring 9.1 which is detachably connected to the second bearing flange 5.2 of the second link 2.2 and which forms a first seat 10.1 for a first bearing which rotatably supports the second bearing pin 4.2 of the first link 2.1 on the second bearing flange 5.2 of the second link 2.2. The first bearing can be a first roller bearing or a first roller bearing arrangement.

In the case of the present exemplary embodiment, the first bearing flange 5.1 of the second link 2.2 has a detachably fastened second bearing support ring 9.2 which forms a second seat 10.2 for a second bearing which rotatably supports the first bearing pin 4.1 of the first link 2.1 on the first bearing flange 5.1 of the second link 2.2. In this case, the first bearing flange 5.1 of the second link 2.2 has an assembling space 11 which is dimensioned such that the second bearing support ring 9.2, when detached from the first bearing flange 5.1 (FIG. 5), is pivotable within the assembling space 11 about a pivot axis S which extends at least substantially perpendicularly to the axis of rotation D of the joint 3 which rotatably connects the first link 2.1 to the second link 2.2.

If the securing means 8 is formed by a first bearing support ring 9.1 which is detachably connected to the second bearing flange 5.2 of the second link 2.2 and forms a first seat 10.1 for a first bearing which rotatably supports the second bearing pin 4.2 of the first link 2.1 on the second bearing flange 5.2 of the second link 2.2, wherein the second bearing flange 5.2 is arranged below the first bearing flange 5.1 in the direction of gravity in a basic configuration of the robot arm 1, as is shown for example in FIG. 3 to FIG. 5, in the case of the present exemplary embodiment the first bearing flange 5.1 of the second link 2.2 can also have a detachably fastened second bearing support ring 9.2 which forms a second seat for a second bearing which supports the first bearing pin 4.1 of the first link 2.1 on the first bearing flange 5.1 of the second link 2.2, wherein the first bearing flange is arranged above the second bearing flange 5.2 in the direction of gravity in a basic configuration of the robot arm 1.

Figure 3:
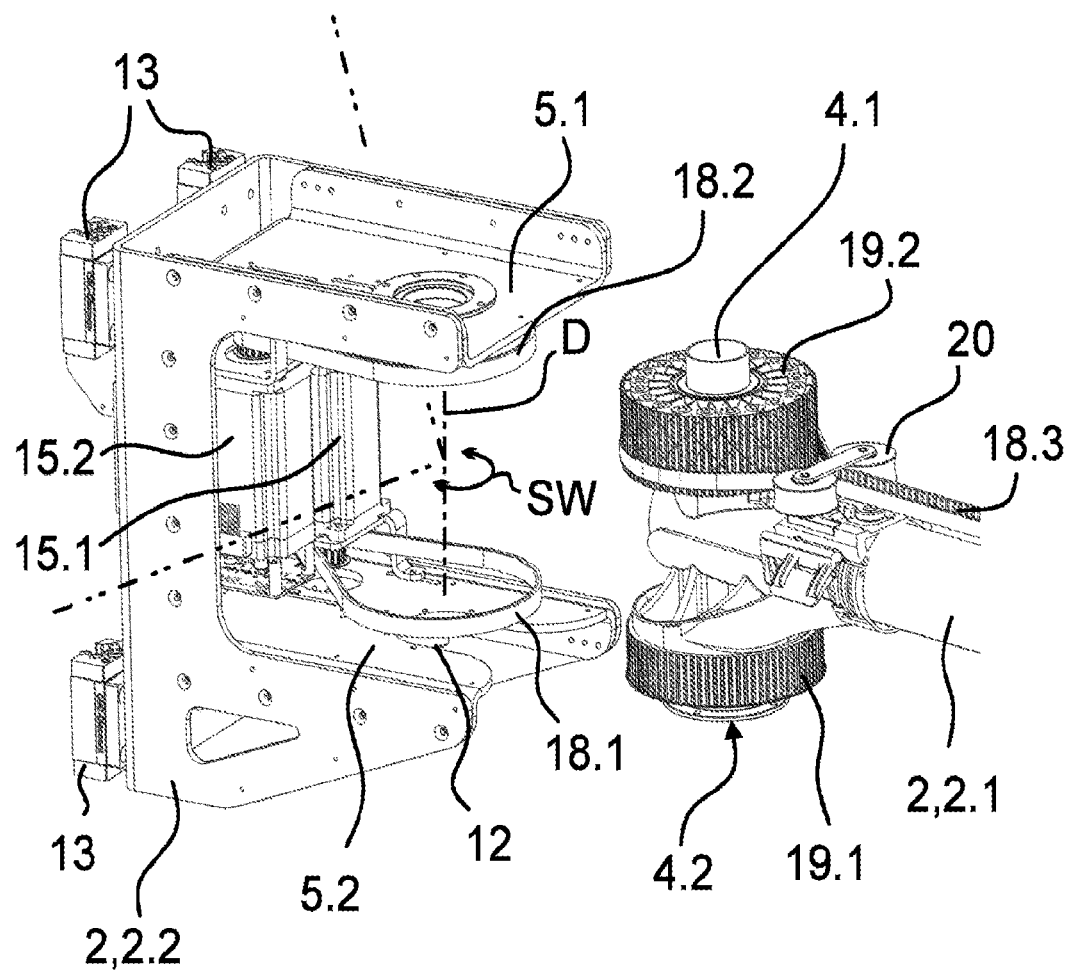
FIG. 3 shows an enlarged partial representation of the robot arm according to FIG. 1 and FIG. 2 in the region of the first link and the second link before insertion.

FIG. 3 illustrates how the joint 3 formed by the first link 2.1 and the second link 2.2 has a structurally restricted pivot angle SW of less than 360 degrees. In the case of the present exemplary embodiment, the pivot angle SW is, for example, less than 270 degrees.

Figure 4:
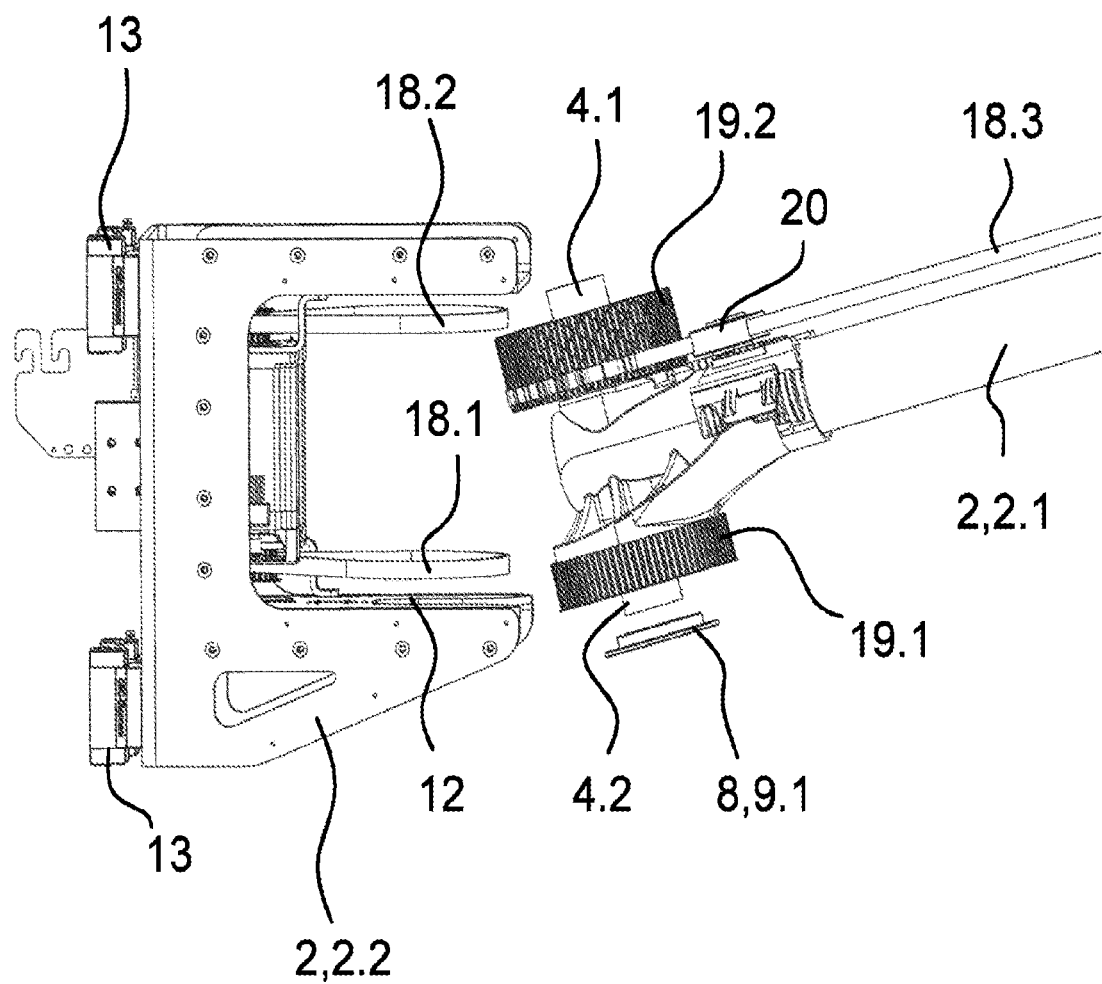
FIG. 4 shows an enlarged partial representation of the robot arm according to FIG. 1 and FIG. 2 in the region of the first link and the second link during insertion.

As can be seen in particular from FIG. 3, the opening 7 of the circumferentially open recess 6b on the second bearing flange 5.2 is arranged in such a manner that the first link 2.1 protruding from the joint 3 protrudes, in a central pivot position of the joint 3, corresponding to the orientation of the first link 2.1 to the second link 2.2 shown in FIG. 3 to FIG. 5, in the angular range of the opening 7 of the circumferentially open recess 6b, and the recess 6b has a compressive force support portion 12 (FIG. 3, FIG. 4) on an edge portion diametrically opposite the opening 7.

In the case of the present exemplary embodiment, the second link 2.2 forms a carriage of a linear axis, which can be designed to be linearly adjustable in height, for example, in a vertical direction R. The second link 2.2 or the carriage can have one or more sliding blocks 13 for this purpose, by means of which the second link 2.2 or the carriage is linearly height-adjustable on rails 14 (only schematically illustrated). The rails 14 can be fastened, for example, to a stationary wall or a stationary frame.

The second link 2.2 can be composed of a plurality of metal sheets, wherein one of the metal sheets can form the first bearing flange 5.1 and another metal sheet can form the second bearing flange 5.2.

A first motor 15.1, in particular a first electric motor, can be arranged on the second link 2.2. The first motor 15.1 has a first motor shaft 16.1. The first motor shaft 16.1 can have, for example, a first pinion 17.1 on which a first belt 18.1 is tensioned. The first belt 18.1 drives a first driven wheel 19.1, which is fixedly connected to the first link 2.1. Driven by the first motor 15.1, the first belt 18.1 drives the first driven wheel 19.1, whereby due to the fixed connection to the first link 2.1, the first link 2.1 can be automatically pivoted relative to the second link 2.2.

Figure 2:
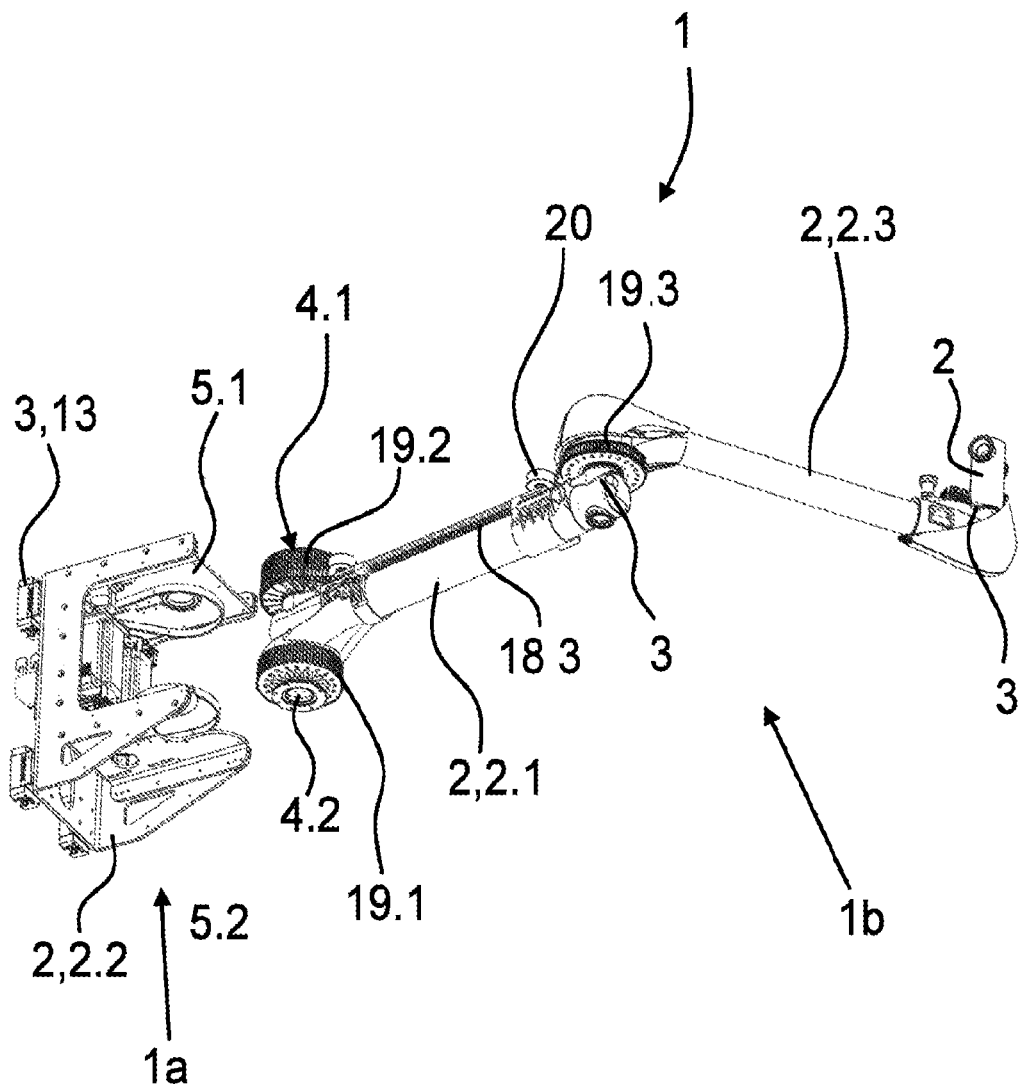
FIG. 2 shows the robot arm according to FIG. 1 with the first pre-assembled assembly and the second pre-assembled assembly in the separate, not yet finally assembled state in a view from below.

A second motor 15.2, in particular a second electric motor, can optionally also be arranged on the second link 2.2. The second motor 15.2 has a second motor shaft 16.2. The second motor shaft 16.2 can have, for example, a second pinion 17.2 on which a second belt 18.2 is tensioned. The second belt 18.2 drives a second driven wheel 19.2, which is rotatably mounted on the first link 2.1. Driven by the second motor 15.2, the second belt 18.2 drives the second driven wheel 19.2, whereby due to the rotatably mounted connection of the second driven wheel 19.2 to the first link 2.1, the second driven wheel 19.2 can be automatically rotated relative to the first link 2.1. This rotational movement is transmitted to a third belt 18.3, which is guided along the first link 2.1 to an additional joint 3 that is distally further remote, as shown in particular in FIG. 1 and FIG. 2. The third belt 18.3 wraps around a third driven wheel 19.3 (FIG. 1 and FIG. 2), which is fixedly connected to a third link 2.3 of the robot arm 1 or the second assembly 1b of the robot arm 1. Driven by the second motor 15.2, the second belt 18.2 drives the second driven wheel 19.2 and the second driven wheel 19.2 drives the third driven wheel 19.3 via the third belt 18.3, whereby due to the fixed connection of the third driven wheel 19.3 to the third link 2.3, the third link 2.3 can be automatically moved, in particular pivoted, relative to the first link 2.1. The third belt 18.3 may be pre-tensioned by a belt tensioner 20.

Figure 6:
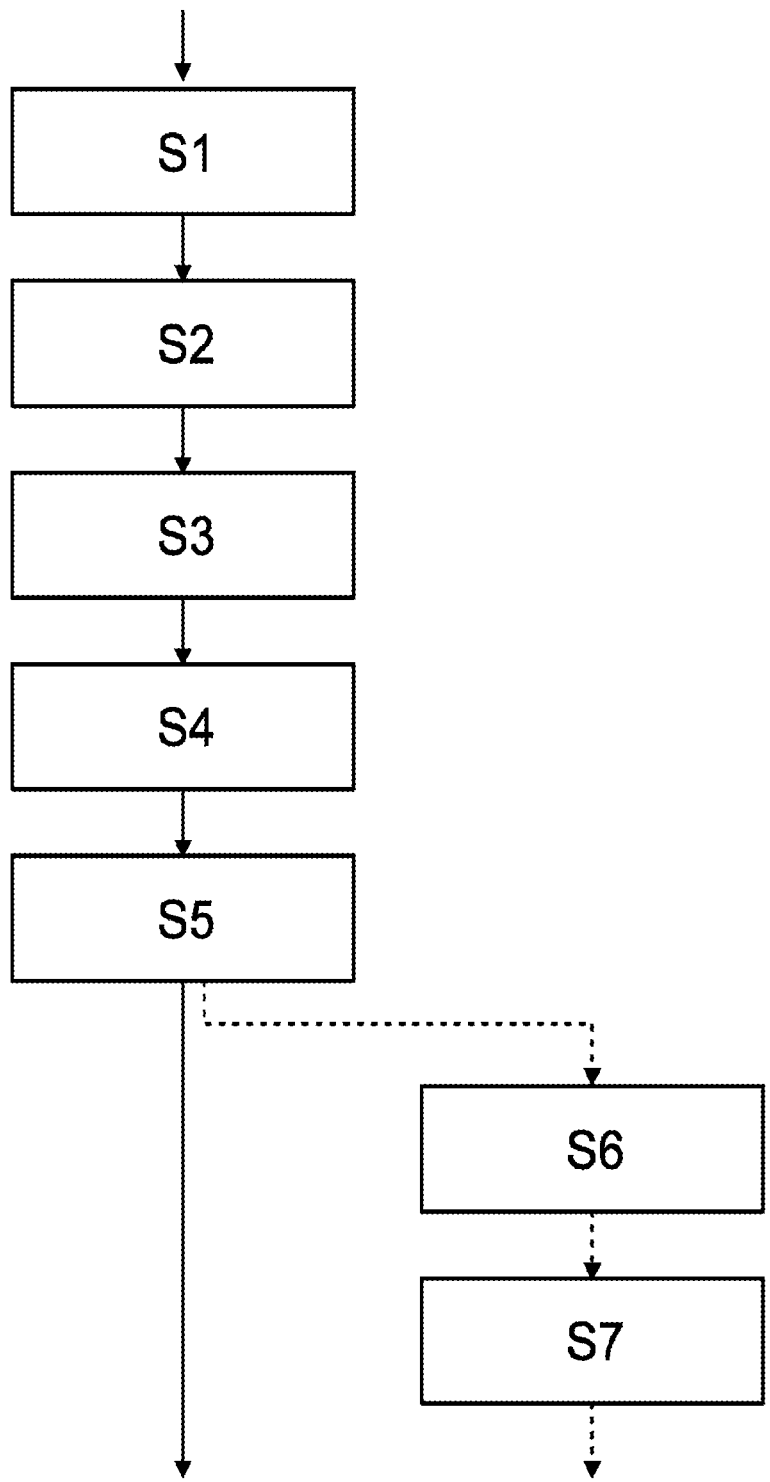
FIG. 6 is an exemplary flow chart of the inventive method.

The method for assembling a robot arm 1, in particular for assembling a robot arm 1 as illustrated in FIG. 1 to FIG. 5, comprises the steps shown schematically in FIG. 6.

In a first step S1, a first assembly 1a of links 2 and joints 3 of the robot arm 1 is pre-assembled, wherein one of the links 2 of the first assembly 1a has a first link 2.1 which has a first bearing pin 4.1 and a second bearing pin 4.2 located opposite the first bearing pin 4.1.

In a second step S2, a second assembly 1b of links 2 and joints 3 of the robot arm 1 is pre-assembled, wherein one of the links 2 of the second assembly 1b has a second link 2.2 which has a first bearing flange 5.1 which is designed for receiving the first bearing pin 4.1 of the first link 2.1 in a rotatably mounted manner and a second bearing flange 5.2, which is designed for receiving the second bearing pin 4.2 of the first link 2.1 in a rotatably mounted manner.

The first bearing flange 5.1 of the second link 2.2 has a circumferentially closed recess 6a, the second bearing flange 5.2 of the second link 2.2 has a circumferentially open recess 6b and the opening 7 of the circumferentially open recess 6b has an opening width W which is greater than the width of the second bearing pin 4.2 of the first link 2.1.

In the subsequent final assembling of the robot arm 1 by assembling the pre-assembled first assembly 1a and second assembly 1b, the first bearing pin 4.1 of the first link 2.1 is initially inserted in a third step S3 at an angle into the circumferentially closed recess 6a of the second link 2.2.

Then, in a fourth step S4, the first link 2.1 is pivoted into its installation position aligned with the axis of rotation D of the joint 3, wherein the second bearing pin 4.2 of the first link 2.1 is moved in a radial direction through the opening 7 of the circumferentially open recess 6b of the second bearing flange 5.2 of the second link 2.2.

In a final fifth step S5, the opening 7 of the circumferentially open recess 6b of the second bearing flange 5.2 is closed by a securing means 8 which is fastened to the second bearing flange 5.2 in order to secure the second bearing pin 4.2 of the first link 2.1 to the second bearing flange 5.2.

In the case of the illustrated exemplary embodiment, the securing means 8 is formed by the first bearing support ring 9.1 which forms a first seat 10.1 for a first bearing which is designed to rotatably support the second bearing pin 4.2 of the first link 2.1 on the second bearing flange 5.2 of the second link 2.2. In this case, the second bearing pin 4.2 of the first link 2.1 is secured on the second bearing flange 5.2 by the first bearing support ring 9.1 being fastened to the second bearing flange 5.2 after the first link 2.1 pivots into the installation position and after the second bearing pin 4.2 moves through the opening 7 of the circumferentially open recess 6b of the second bearing flange 5.2.

A second bearing support ring 9.2 is provided which has a second seat 10.2 for a second bearing which is designed to rotatably support the first bearing pin 4.1 of the first link 2.1 on the first bearing flange 5.1 of the second link 2.2. In this case, the first bearing flange 5.1 of the second link 2.2 has an assembling space 11 which is dimensioned in such a manner that the second bearing support ring 9.2, when detached from the first bearing flange 5.1, is pivotable a pivot axis S which extends at least substantially perpendicularly to the axis of rotation D of the joint 3 which rotatably connects the first link 2.1 to the second link 2.2.

In this exemplary embodiment, the method comprises, in an additional sixth step S6, inserting the first bearing pin 5.1 of the first link 2.1 at an angle into the circumferentially closed recess 6a of the second link 2.2 and inserting the first bearing pin 4.1 of the first link 2.1 into the second bearing support ring 9.2 when the second bearing support ring 9.2 is detached from the first bearing flange 5.1, and, in an additional seventh step S7, fastening the second bearing support ring 9.2 to the first bearing flange 5.1 after the first link 2.1 is pivoted into its installation position aligned with the axis of rotation D of the joint 3.

After the pivoting of the first link 2.1 into its installation position aligned with the axis of rotation D of the joint 3, the first bearing support ring 9.1 can first be fastened to the second bearing flange 5.2 after the second bearing pin 4.2 moves through the opening 7 of the circumferentially open recess 6b of the second bearing flange 5.2, and then the second bearing support ring 9.2 can be fastened to the first bearing flange 5.1.

Before inserting the first bearing pin 4.1 of the first link 2.1 into the circumferentially closed recess 6a of the second link 2.2, in particular into the second bearing support ring 9.2, a first roller bearing can be inserted between the first bearing pin 4.1 and the circumferentially closed recess 6a or the second bearing support ring 9.2, and before inserting the second bearing pin 4.2 of the first link 2.1 into the circumferentially open recess 6b of the second link 2.2, in particular into the first bearing support ring 9.1, a second roller bearing can be inserted between the second bearing pin 4.2 and the circumferentially open recess 7 or the first bearing support ring 9.1.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:
1. A robot arm, comprising:

at least first and second serially arranged links coupled together for articulation relative to one another;
a first end of the first link comprising a first bearing pin and a second bearing pin positioned opposite the first bearing pin at the first end;
a first end of the second link comprising a first bearing flange on which the first bearing pin of the first link is rotatably mounted, and a second bearing flange on which the second bearing pin of the first link is rotatably mounted;
a circumferentially closed recess in the first bearing flange and in which the first bearing pin of the first link is received;
a circumferentially open recess on the second bearing flange and in which the second bearing pin of the first link is received;
the circumferentially open recess having an opening with an opening width that is greater than a width of the second bearing pin; and
securing means associated with the second bearing flange and securing the second bearing pin of the first link to the circumferentially open recess.

2. The robot arm of claim 1, wherein the securing means comprises a first bearing support ring detachably connected to the second bearing flange and forming a first seat of a first bearing that rotatably supports the second bearing pin on the second bearing flange.

3. The robot arm of claim 1, further comprising:
a second bearing support ring detachably connected to the first bearing flange and forming a second seat of a second bearing that rotatably supports the first bearing pin on the first bearing flange;
the first bearing flange having an assembling space sized such that the second bearing support ring, when detached from the first bearing flange, is pivotable within the assembling space about a pivot axis that extends perpendicularly to an axis of rotation of the joint that rotatably connects the first link to the second link.

4. The robot arm of claim 1, wherein:
the securing means comprises a first bearing support ring detachably connected to the second bearing flange and forming a first seat of a first bearing that rotatably supports the second bearing pin on the second bearing flange;
the second bearing flange is arranged below the first bearing flange in the direction of gravity in a basic configuration of the robot arm; and
the robot arm further comprises a second bearing support ring detachably connected to the first bearing flange and forming a second seat of a second bearing that rotatably supports the first bearing pin on the first bearing flange.

5. The robot arm of claim 1, wherein:
a joint formed between the first and second links has a structurally restricted pivot angle of less than 360 degrees;
the opening of the circumferentially open recess is arranged on the second bearing flange such that, in a central pivot position of the joint, the first link projects from the joint in the angular range of the opening of the circumferentially open recess; and
the circumferentially open recess has a compressive force support portion on an edge portion of the second bearing flange located diametrically opposite the opening.

6. A method for assembling a robot arm, comprising:
obtaining a first link assembly comprising at least a first link, a first end of the first link comprising a first bearing pin and a second bearing pin disposed opposite the first bearing pin;
obtaining a second link assembly comprising at least a second link, the second link comprising a first bearing flange configured for receiving the first bearing pin in a rotatably mounted manner, and a second bearing flange configured for receiving the second bearing pin in a rotatably mounted manner;
the first bearing flange comprising a circumferentially closed recess;
the second bearing flange comprising a circumferentially open recess, wherein an opening of the circumferentially open recess has an opening width that is greater than a width of the second bearing pin; and
assembling the robot arm by assembling the first link assembly and the second link assembly by:
inserting the first bearing pin of the first link at an angle into the circumferentially closed recess of the second link,
pivoting the first link into an installation position such that the pins are aligned with an axis of rotation of the joint, and the second bearing pin is moved in a radial direction through the opening of the circumferentially open recess of the second bearing flange, and
closing the opening of the circumferentially open recess with a securing means which is fastened to the second bearing flange in order to secure the second bearing pin of the first link on the second bearing flange.

7. The method of claim 6, wherein:
the securing means comprises a first bearing support ring that forms a first seat of a first bearing configured to rotatably support the second bearing pin on the second bearing flange; and
securing the second bearing pin on the second bearing flange comprises fastening the first bearing support ring to the second bearing flange after the first link is pivoted into the installation position and the second bearing pin moves through the opening of the circumferentially open recess of the second bearing flange.

8. The method of claim 6, further comprising:
obtaining a second bearing support ring that forms a second seat of a second bearing configured to rotatably support the first bearing pin on the first bearing flange;
inserting the first bearing pin of the first link at an angle into the circumferentially closed recess of the second link;
inserting the first bearing pin into the second bearing support ring while the second bearing support ring is detached from the first bearing flange; and
fastening the second bearing support ring to the first bearing flange after the first link is pivoted into the installation position.

9. The method of claim 8, further comprising:
while the second bearing support ring is detached from the first bearing flange, pivoting the second bearing support ring within an assembling space of the first bearing flange and about a pivot axis that extends perpendicularly to an axis of rotation of the joint that rotatably connects the first link to the second link.

10. The method of claim 8, further comprising:
after the pivoting of the first link into the installation position, fastening the first bearing support ring to the second bearing flange after the second bearing pin moves through the opening of the circumferentially open recess of the second bearing flange; and then fastening the second bearing support ring to the first bearing flange.

11. The method of claim 6, further comprising at least one of:

before inserting the first bearing pin of the first link into the circumferentially closed recess of the second link, inserting a first roller bearing between the first bearing pin and the circumferentially closed recess or the second bearing support ring; or before inserting the second bearing pin of the first link into the circumferentially open recess of the second link, inserting a second roller bearing between the second bearing pin and the circumferentially open recess or the first bearing support ring.

\* \* \* \* \*